United States Patent
Martin

(10) Patent No.: US 6,540,156 B2
(45) Date of Patent: Apr. 1, 2003

(54) ABOVE-GROUND AND IN-GROUND FERTILIZER AND IRRIGATION APPARATUS

(76) Inventor: Paul E. Martin, 6 Meridian Dr., Salem, NH (US) 03079

(*) Notice: Subject to any disclaimer, the term of this patent is extended or adjusted under 35 U.S.C. 154(b) by 0 days.

(21) Appl. No.: 09/858,940

(22) Filed: May 16, 2001

(65) Prior Publication Data

US 2002/0001507 A1 Jan. 3, 2002

Related U.S. Application Data

(60) Provisional application No. 60/204,537, filed on May 16, 2000.

(51) Int. Cl.$^7$ ................................................. B25B 7/26
(52) U.S. Cl. ..................... 239/310; 239/317; 239/318; 239/207; 405/36
(58) Field of Search ................................ 47/48.5, 58.1, 47/905; 111/118; 239/310, 317, 318, 207; 405/36

(56) References Cited

U.S. PATENT DOCUMENTS

| 4,584,791 A | 4/1986 | Wolf |
| 4,721,245 A | 1/1988 | Zweeden |
| 4,925,096 A | 5/1990 | Gill |
| 5,294,212 A | 3/1994 | Mehouder |
| 5,527,366 A | 6/1996 | Mazurkiewicz |

Primary Examiner—J. J. Swann
Assistant Examiner—Katherine Mitchell

(57) ABSTRACT

A fertilizer and irrigation apparatus includes an inflow pipe, a shunt pipe connected to the inflow pipe, and a chemical additive assembly connected in parallel to the shunt pipe. An outflow pipe is also connected to the shunt pipe. A portion of the inflow pipe, the shunt pipe, the chemical additive assembly, and the outflow pipe are all above ground. The chemical additive assembly includes a quantity of a chemical additive. A manifold is connected to the outflow pipe. A plurality of in-ground distribution conduits are connected to the manifold, wherein each of the distribution conduits includes at least one above-ground sprinkler head. In addition, an auxiliary inflow assembly can be connected to the inflow pipe so that chemical additives can be supplied to the fertilizer and irrigation apparatus from an outside source.

11 Claims, 3 Drawing Sheets

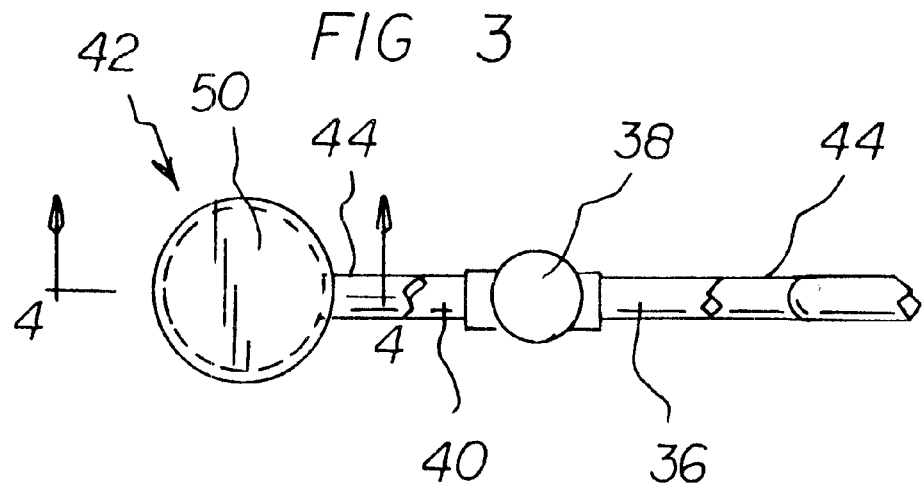
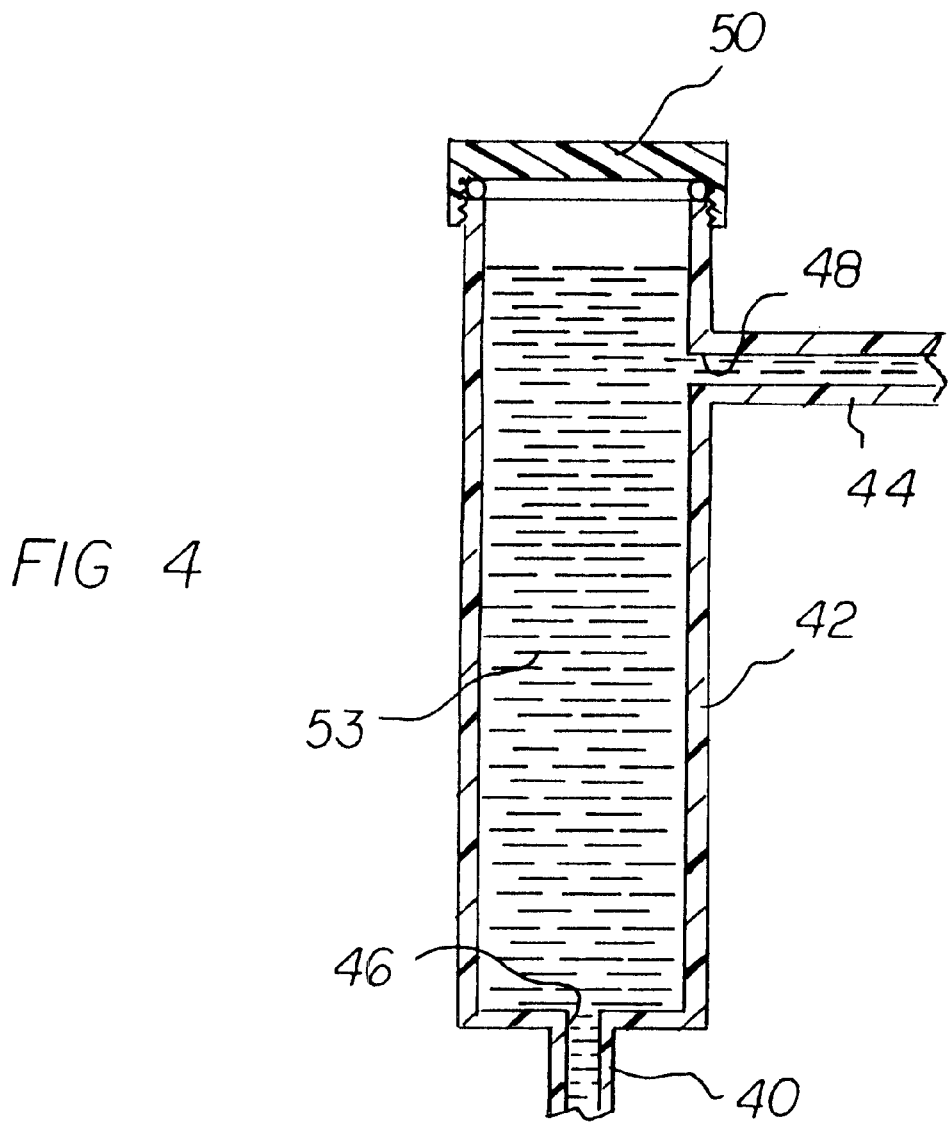

ABOVE-GROUND AND IN-GROUND FERTILIZER AND IRRIGATION APPARATUS

CROSS-REFERENCE TO RELATED APPLICATION

This application claims priority based upon my Provisional Application Ser. No. 60/204,537, filed May 16, 2000.

BACKGROUND OF THE INVENTION

1. Field of the Invention

The present invention relates generally to irrigation systems, and, more particularly, to irrigation systems in which a chemical additive is added to the irrigation water.

2. Description of the Prior Art

Throughout the years, a number of innovations have been developed relating to irrigating growing plants, and the following U.S. patents are representative of some of those innovations: U.S. Pat. Nos. 4,584,791, 4,721,245, 4,925,096, 5,294,212, and 5,527,366. More specifically, U.S. Pat. No. 4,584,791 discloses a soilless agricultural system. It would be desirable, however, if an irrigation system were provided that is useful for plants that are growing in soil in the ground.

U.S. Pat. No. 4,721,245 discloses a method an apparatus for spraying a liquid. The apparatus employs two pumps, one for a carrier fluid, and one for an active substance. Rather than having one or more pumps for an irrigation system, it would be desirable if an irrigation system could employ a pressurized water supply provided by a centralized water utility, such as in a municipality or other governmental unit.

U.S. Pat. No. 4,925,096 discloses an apparatus for delivering a liquid to plants in the soil in the ground by employing a traveling boom that travels over the ground. Rather than require the moving parts needed for a traveling boom it would be desirable if an irrigation system were provided which does not employ a traveling boom.

U.S. Pat. No. 5,294,212 discloses an irrigation system that has a chemical additive assembly located below ground. Since weeds and other plants can readily cover a below-ground chemical additive assembly, it would be desirable if an irrigation system has a chemical additive assembly that is above ground.

U.S. Pat. No. 5,527,366 discloses a method of applying herbicides to plants which employs a high pressure spray for the plants, wherein the high pressure spray is provided by high pressure pump. All components of the apparatus are above ground. Although it is desirable for spray nozzles to be located above ground, it would be desirable if the pipes leading to the spray nozzles were underground.

Still another feature would be desirable in an above-ground and in-ground fertilizer and irrigation apparatus. When a centralized water supply is unavailable, for whatever reason, it would be desirable if an auxiliary water inflow system could be connected to an above-ground portion of a fertilizer and irrigation system to provide water in the absence of water from the centralized supply.

Thus, while the foregoing body of prior art indicates it to be well known to use irrigation systems, the prior art described above does not teach or suggest an above-ground and in-ground fertilizer and irrigation apparatus which has the following combination of desirable features: (1) is useful for plants that are growing in soil in the ground; (2) employs a pressurized water supply provides by a centralized water utility, such as in a municipality or other governmental unit; (3) does not employ a traveling boom; (4) has a chemical additive assembly that is above ground; (5) has underground pipes leading to above-ground spray nozzles; and (6) has an above-ground portion that can be connected to an auxiliary water inflow system. The foregoing desired characteristics are provided by the unique above-ground and in-ground fertilizer and irrigation apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a fertilizer and irrigation apparatus which includes an inflow pipe and a shunt pipe which includes two ends, wherein a first shunt pipe end is connected to the inflow pipe. A chemical additive assembly is connected in parallel to the shunt pipe. The chemical additive assembly includes a quantity of a chemical additive. An outflow pipe is connected to a second shunt pipe end. A manifold is connected to the outflow pipe. A portion of the inflow pipe, the shunt pipe, the chemical additive assembly, and the outflow pipe are all above ground. A plurality of distribution conduits are connected to the manifold, wherein each of the distribution conduits includes at least one exit orifice. The distribution conduits can be installed in-ground. The exit orifice for each distribution conduit can be in a form of a nozzle which is positioned above ground. The nozzle can be in a form of a sprinkler head.

The chemical additive assembly includes an additive assembly inflow pipe connected to the shunt pipe. An additive assembly valve is connected to the additive assembly inflow pipe. An additive leach assembly is connected between the additive assembly valve and the shunt pipe. The additive leach assembly includes a leachant inflow pipe connected to the additive assembly valve. An additive container is connected to the leachant inflow pipe, and an additive outflow pipe is connected to the additive container. The additive container includes a leachant inflow port located at a bottom portion of the additive container and includes an additive outflow port located at a top portion of the additive container. A container cap is provided for capping the additive container.

The chemical additive can be in a form of a quantity of liquid concentrate. The chemical additive can be in a form of a quantity of granular particles. The chemical additive can be in a form of a quantity of tablets.

An auxiliary inflow assembly can be connected to the inflow pipe. The auxiliary inflow assembly includes an auxiliary input pipe which is connected to the inflow pipe. An auxiliary input valve is connected to the auxiliary input pipe, and an auxiliary fitting is connected to the auxiliary input valve.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining a preferred embodiment of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved above-ground and in-ground fertilizer and irrigation apparatus which has all of the advantages of the prior art and none of the disadvantages.

It is another object of the present invention to provide a new and improved above-ground and in-ground fertilizer and irrigation apparatus which may be easily and efficiently manufactured and marketed.

It is a further object of the present invention to provide a new and improved above-ground and in-ground fertilizer and irrigation apparatus which is of durable and reliable construction.

An even further object of the present invention is to provide a new and improved above-ground and in-ground fertilizer and irrigation apparatus which is susceptible of a low cost of manufacture with regard to both materials and labor, and which accordingly is then susceptible of low prices of sale to the consuming public, thereby making such above-ground and in-ground fertilizer and irrigation apparatus available to the buying public.

Still yet a further object of the present invention is to provide a new and improved above-ground and in-ground fertilizer and irrigation apparatus which is useful for plants that are growing in soil in the ground.

Still another object of the present invention is to provide a new and improved above-ground and in-ground fertilizer and irrigation apparatus that employs a pressurized water supply provides by a centralized water utility, such as in a municipality or other governmental unit.

Yet another object of the present invention is to provide a new and improved above-ground and in-ground fertilizer and irrigation apparatus which does not employ a traveling boom.

Even another object of the present invention is to provide a new and improved above-ground and in-ground fertilizer and irrigation apparatus that has a chemical additive assembly that is above ground.

Still a further object of the present invention is to provide a new and improved above-ground and in-ground fertilizer and irrigation apparatus which has underground pipes leading to above-ground spray nozzles.

Yet another object of the present invention is to provide a new and improved above-ground and in-ground fertilizer and irrigation apparatus that has an above-ground portion that can be connected to an auxiliary water inflow system.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 3 is a top view, partially broken away, of the portion of the embodiment of the invention of FIG. 2 taken along line 3—3 thereof.

FIG. 4 is a cross-sectional view of the embodiment of the invention shown in FIG. 3 taken along line 4—4 thereof, wherein the fertilizer therein is in a liquid form.

DESCRIPTION OF THE PREFERRED EMBODIMENT

With reference to the drawings, a new and improved above-ground and in-ground fertilizer and irrigation apparatus embodying the principles and concepts of the present invention will be described.

Figure 1:
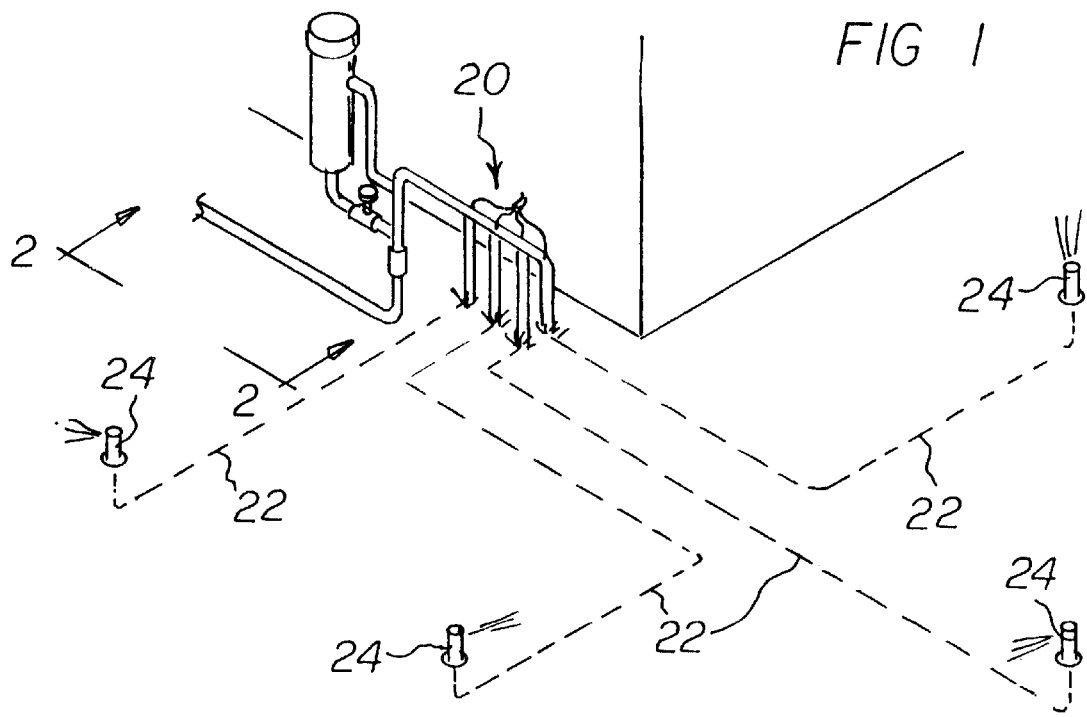
FIG. 1 is a perspective view showing a preferred embodiment of the in-ground fertilizer and irrigation apparatus of the invention.

Turning to FIG. 1, there is shown an exemplary embodiment of the above-ground and in-ground fertilizer and irrigation apparatus of the invention which includes an inflow pipe 12 and a shunt pipe 14 which includes two ends, wherein a first shunt pipe end is connected to the inflow pipe 12. A chemical additive assembly 16 is connected in parallel to the shunt pipe 14. A portion of the inflow pipe 12, the shunt pipe 14, the chemical additive assembly 16, and the outflow pipe 18 are all above ground. The chemical additive assembly 16 includes a quantity of a chemical additive. An outflow pipe 18 is connected to a second shunt pipe end. A manifold 20 is connected to the outflow pipe 18. A plurality of distribution conduits 22 are connected to the manifold 20, wherein each of the distribution conduits 22 includes at least one exit orifice. The distribution conduits 22 can be installed in-ground. The exit orifice for each distribution conduit 22 can be in a form of a nozzle 24 which is positioned above ground. The nozzle 24 can be in a form of a sprinkler head 24.

The chemical additive assembly 16 includes an additive assembly inflow pipe 36 connected to the shunt pipe 14. An additive assembly valve 38 is connected to the additive assembly inflow pipe 36. An additive leach assembly is connected between the additive assembly valve 38 and the shunt pipe 14. The additive leach assembly includes a leachant inflow pipe 40 connected to the additive assembly valve 38. An additive container 42 is connected to the leachant inflow pipe 40, and an additive outflow pipe 44 is connected to the additive container 42. The additive container 42 includes a leachant inflow port 46 located at a bottom portion of the additive container 42 and includes an additive outflow port 48 located at a top portion of the additive container 42. A container cap 50 is provided for capping the additive container 42.

Figures 5, 6:
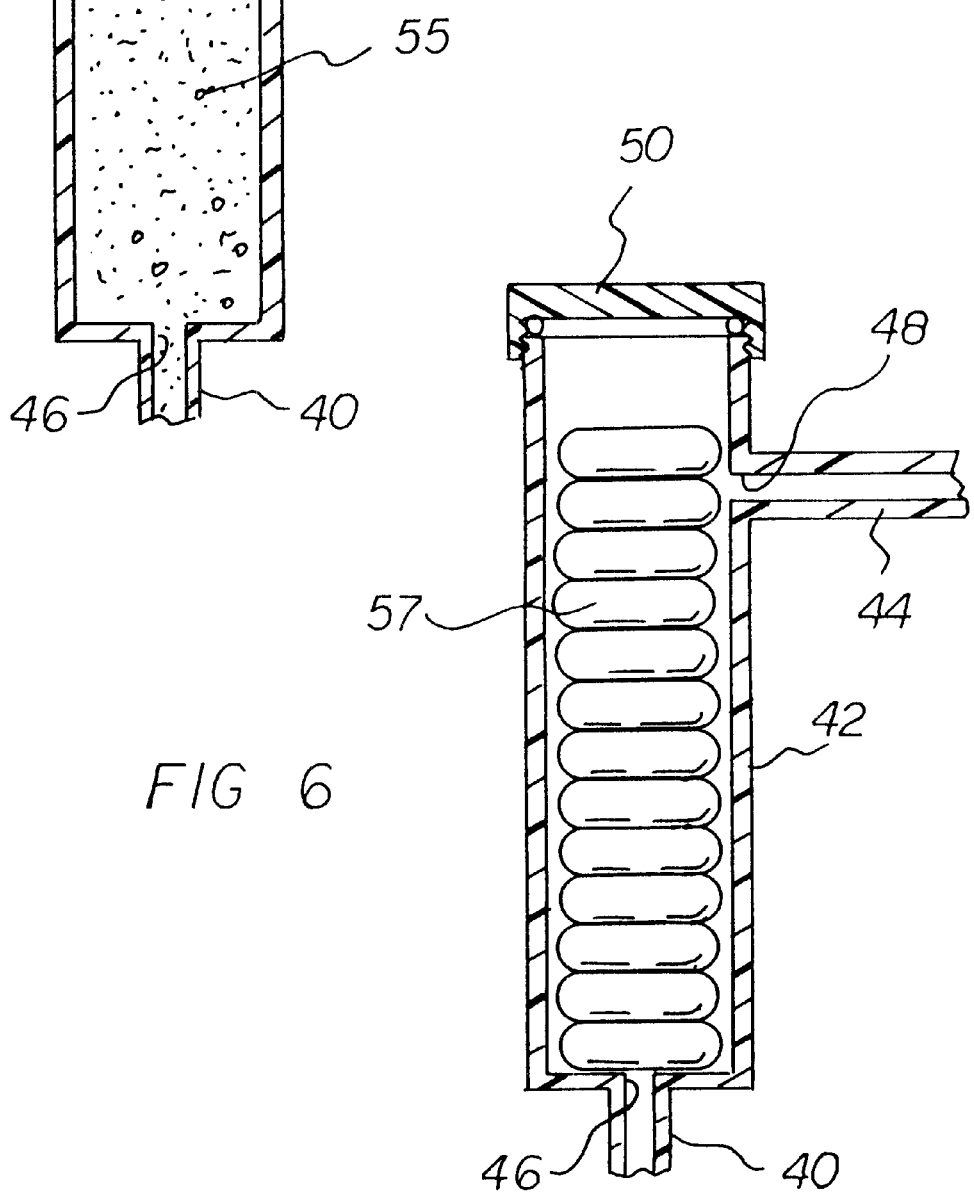
FIG. 5 is a cross-sectional view of the embodiment of the invention, similar to the cross-sectional of FIG. 4, when the fertilizer therein is in a granular form.
FIG. 6 is a cross-sectional view of the embodiment of the invention, similar to the cross-sectional of FIG. 4, when the fertilizer therein is in a tablet form.

As shown in FIG. 4, the chemical additive can be in a form of a quantity of liquid concentrate 53. As shown in FIG. 5, the chemical additive can be in a form of a quantity of granular particles 55. As shown in FIG. 6, the chemical additive can be in a form of a quantity of tablets 57.

An auxiliary inflow assembly 28 can be connected to the inflow pipe 12. The auxiliary inflow assembly 28 includes an auxiliary input pipe 30 which is connected to the inflow pipe 12. An auxiliary input valve 32 is connected to the auxiliary input pipe 30, and an auxiliary fitting 34 is connected to the auxiliary input valve 32.

The fertilizer and irrigation apparatus of the invention can be used to both fertilize and irrigate a portion of the ground and lawn at the same time. For simple irrigation, the additive assembly valve 38 is fully closed. Water flows into the inflow pipe 12 from a water source (not shown), passes through the shunt pipe 14, passes through the outflow pipe 18, through the manifold 20, through the distribution conduits 22, and out from the nozzle 24, as shown in FIG. 1.

For combining fertilization with irrigation, a quantity of a chemical additive is added to the additive container 42, and the additive assembly valve 38 is opened, either partially or fully, depending upon how much additive is to be added to the irrigation water. The direction of water flow is shown by arrows 19. More specifically, with the additive assembly valve 38 opened, water flows from the inflow pipe 12 and enters the shunt pipe 14. Some of the water flows straight through the shunt pipe 14 and directly into the outflow pipe 18. However, a portion of the water that enters the shunt pipe 14 enters the additive assembly inflow pipe 36, flows though the opened additive assembly valve 38, through the leachant inflow pipe 40, through the leachant inflow port 46, and into the additive container 42. Inside the additive container 42, the chemical additive is leached or dissolved into the water. Then, the dissolved chemical additive flows upward and out of the additive container 42 through the additive outflow port 48, through the additive outflow pipe 44, into the shunt pipe 14, and into the outflow pipe 18. The solvent water and the dissolved chemical additive then flows through the manifold 20, through the distribution conduits 22, and out from the sprinkler heads 24, as shown in FIG. 1.

When the chemical additive is depleted, or when it is desired to change the type of chemical additive that is employed, the container cap 50 is unscrewed from the additive container 42, and additional chemical additive is added to the additive container 42. Then, the container cap 50 is replaced.

Figure 2:
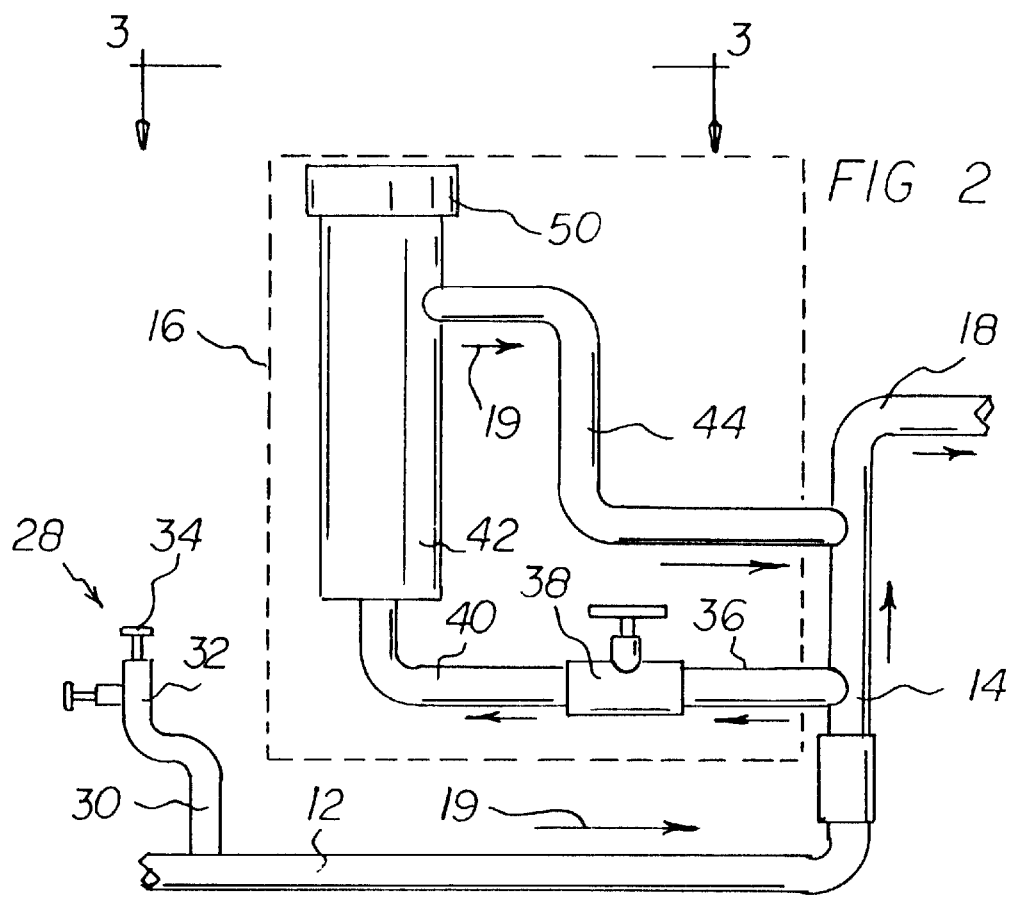
FIG. 2 is an enlarged front view of the portion of the embodiment of the invention taken along line 2—2 of FIG. 1.

There may be times when it may be desirable to bypass the chemical additive assembly 16 and have a chemical additive added to the ground and lawn from an outside source. When such is the case, as shown in FIG. 2, an auxiliary inflow assembly 28 is employed. More specifically, the outside source of the chemical additive is fitted onto the auxiliary fitting 34, the auxiliary input valve 32 is opened, and the auxiliary additive flows through the auxiliary fitting 34, through the auxiliary input valve 32, through the auxiliary input pipe 30, and into the inflow pipe 12 from which it is ultimately distributed to the manifold 20, the distribution conduits 22, and the sprinkler heads 24.

The in-ground fertilizer and irrigation apparatus of the invention can be an original installation for a lawn. Also, the in-ground fertilizer and irrigation apparatus of the invention can be provided as a retrofitting to an in-place irrigation system.

The components of the above-ground and in-ground fertilizer and irrigation apparatus of the invention can be made from inexpensive and durable metal and plastic materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved above-ground and in-ground fertilizer and irrigation apparatus that is low in cost, relatively simple in design and operation, and which may advantageously be used for plants that are growing in soil in the ground. With the invention, an above-ground and in-ground fertilizer and irrigation apparatus is provided which employs a pressurized water supply provides by a centralized water utility, such as in a municipality or other governmental unit. With the invention, an above-ground and in-ground fertilizer and irrigation apparatus is provided which does not employ a traveling boom. With the invention, an above-ground and in-ground fertilizer and irrigation apparatus is provided which has a chemical additive assembly that is above ground. With the invention, an above-ground and in-ground fertilizer and irrigation apparatus is provided which has underground pipes leading to above-ground spray nozzles. With the invention, an above-ground and in-ground fertilizer and irrigation apparatus is provided which has an above-ground portion that can be connected to an auxiliary water inflow system.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as to encompass all such modifications as well as all relationships equivalent to those illustrated in the drawings and described in the specification.

Finally, it will be appreciated that the purpose of the annexed Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by Letters Patent of the united states is as follows:

1. A fertilizer and irrigation apparatus, comprising:
   an inflow pipe, a portion of which is above ground,
   an above-ground shunt pipe which includes two ends, wherein a first shunt pipe end is connected to said inflow pipe,
   an above-ground chemical additive assembly connected in parallel to said shunt pipe, wherein said chemical additive assembly includes a quantity of a chemical additive, an above-ground outflow pipe connected to a second shunt pipe end,
a manifold connected to said outflow pipe,
a plurality of below-ground distribution conduits connected to said manifold, wherein each of said distribution conduits includes at least one above-ground exit orifice,
wherein said chemical additive assembly includes:
an additive assembly inflow pipe connected to said shunt pipe,
an additive assembly valve connected to said additive assembly inflow pipe,
an additive leach assembly connected between said additive assembly valve and said shunt pipe,
wherein said additive leach assembly includes:
a leachant inflow pipe connected to said additive assembly valve,
an additive container connected to said leachant inflow pipe, and
an additive outflow pipe connected to said additive container,
wherein said additive container includes a leachant inflow port located at a bottom portion of said additive container and includes an additive outflow port located at a top portion of said additive container,
wherein said additive outflow port is connected between said top portion of said additive container and said additive outflow pipe and said leachant inflow port is connected between said bottom portion of said additive container and said leachant inflow pipe, and
wherein said above-ground shunt pipe is disposed substantially vertically, and said additive outflow pipe and said leachant inflow pipe are disposed substantially horizontally whereby to support said additive container therebetween on said substantially vertically disposed above-ground shunt pipe.

2. The apparatus of claim 1 wherein said manifold is above ground and is connected to extend substantially horizontally from said substantially vertically disposed above-ground shunt pipe.

3. The apparatus of claim 1 wherein at least one exit orifice for each distribution conduit is in a form of a nozzle.

4. The apparatus of claim 3 wherein said nozzle is in a form of a sprinkler head.

5. The apparatus of claim 1, further including:
a container cap for capping said additive container.

6. The apparatus of claim 1 wherein said chemical additive is in a form of a quantity of liquid concentrate.

7. The apparatus of claim 1 wherein said chemical additive is in a form of a quantity of granular particles.

8. The apparatus of claim 1 wherein said chemical additive is in a form of a quantity of tablets.

9. The apparatus of claim 1, further including:
an auxiliary inflow assembly connected to said inflow pipe.

10. The apparatus of claim 9 wherein said auxiliary inflow assembly includes:
an auxiliary input pipe connected to said inflow pipe, an auxiliary input valve connected to said auxiliary input pipe, and an auxiliary fitting connected to said auxiliary input valve.

11. The fertilizer and irrigation apparatus of claim 1 wherein said additive container is substantially cylindrically shaped having a substantially flat bottom floor, said leachant inflow port is located substantially centrally of said substantially flat bottom floor at said bottom portion of said additive container, and said leachant inflow pipe is connected to said leachant inflow port through a right-angle bend.

* * * * *